Sept. 9, 1941.　　　　R. GUNN　　　　2,255,053
APPARATUS AND METHOD FOR DETECTING DEFECTS IN METALLIC OBJECTS
Filed Dec. 17, 1940　　　2 Sheets-Sheet 1
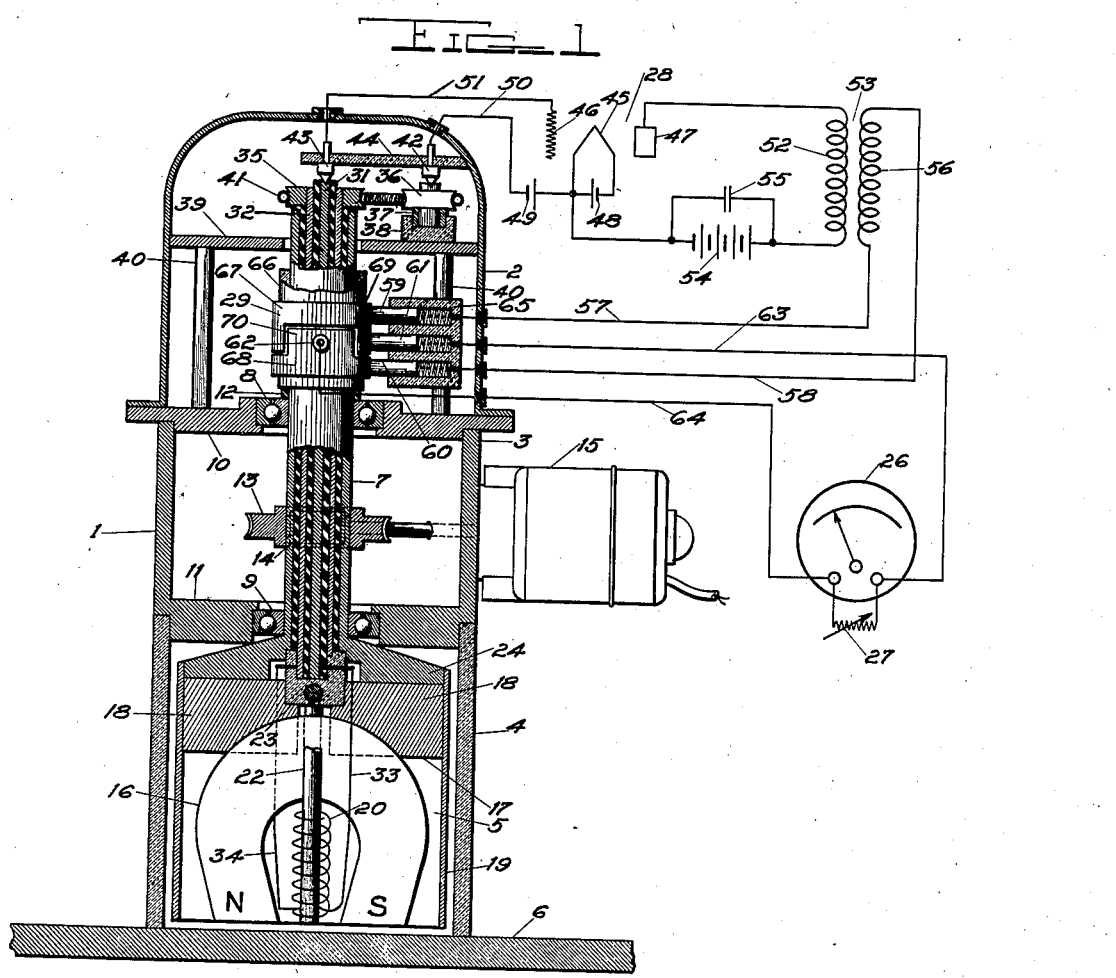
INVENTOR
Ross Gunn
BY
ATTORNEY Sept. 9, 1941. R. GUNN 2,255,053
APPARATUS AND METHOD FOR DETECTING DEFECTS IN METALLIC OBJECTS
Filed Dec. 17, 1940 2 Sheets-Sheet 2
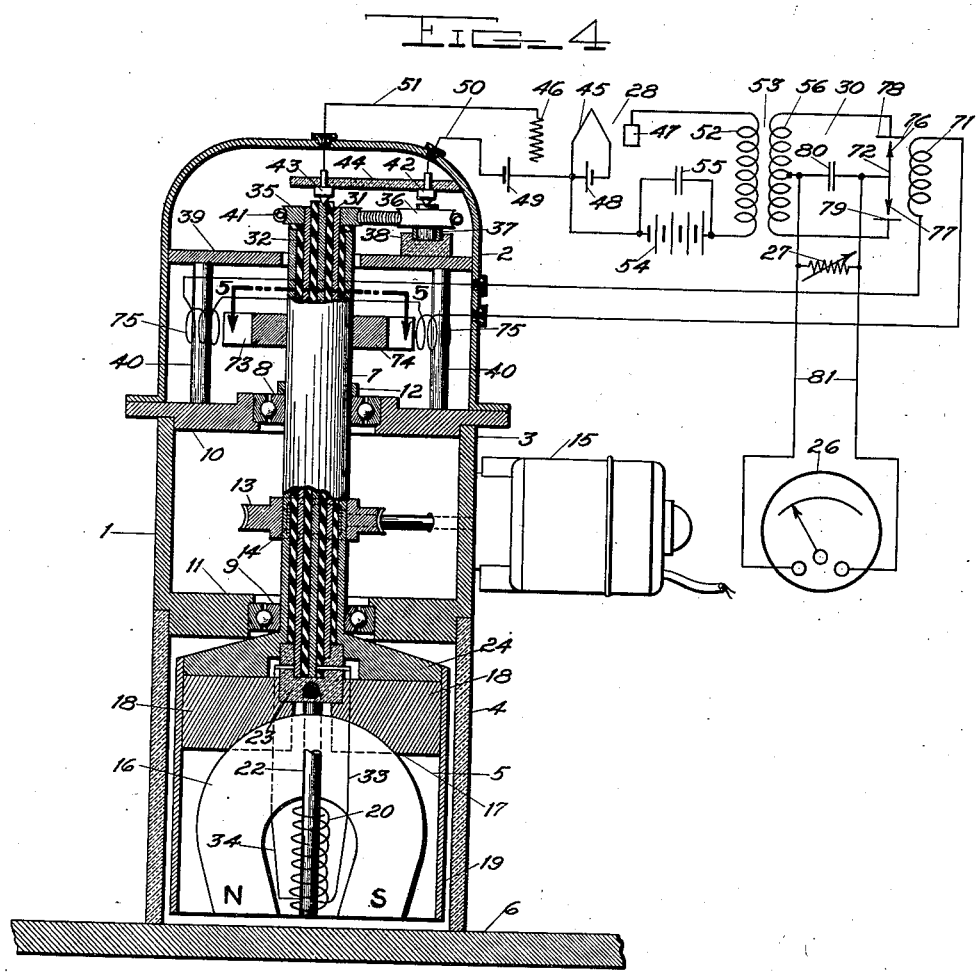
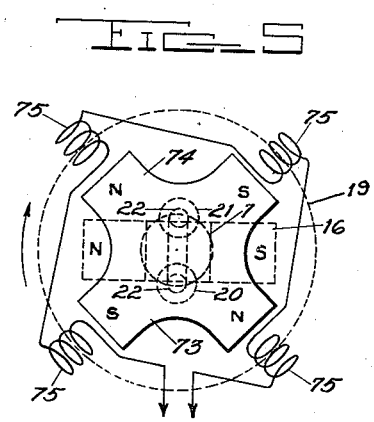
INVENTOR
*Ross Gunn*
BY
ATTORNEY Patented Sept. 9, 1941

2,255,053

UNITED STATES PATENT OFFICE 2,255,053

APPARATUS AND METHOD FOR DETECTING DEFECTS IN METALLIC OBJECTS

Ross Gunn, Washington, D. C.

Application December 17, 1940, Serial No. 370,520

20 Claims. (Cl. 175—183)

(Granted under the act of March 3, 1883, as amended April 30, 1928; 370 O. G. 757)

My invention relates in general to an apparatus and method for detecting defects in metallic objects which is based upon the principle that a system of eddy currents induced in metallic objects will have a predetermined configuration if no inhomogeneities are present therein, but if any inhomogeneity is present the predetermined configuration will be altered. By utilizing the electromagnetic fields generated by the eddy currents in their altered configurations for inducing a voltage or current in a suitable exploratory unit, it is possible to ascertain the presence of a defect.

It is a well known fact that the induced eddy currents have a tendency to concentrate near the surface of the objects under test, their magnitude decreasing with increasing depth; and that the relative depth of the eddy current penetration depends among other things on the frequency of the induced eddy currents, the penetration increasing with decreasing frequency. In the prior art apparatus and methods the frequency of the induced eddy currents has not been sufficiently low to permit effective penetration into the object under test, nor has the intensity of the induced eddy currents been of adequate magnitude to insure detection at any desired depth. Furthermore, in the prior art apparatus and methods the voltage or current induced by the electromagnetic fields generated by the eddy currents has had the same frequency as the eddy currents, which has not always resulted in effective detection.

The prior art deficiencies are effectually overcome in the apparatus and method of the present invention by inducing low-frequency high-intensity eddy currents in the object under test to achieve effective penetration therein and detection at considerable depths. By inducing with the electromagnetic fields generated by the eddy currents a voltage or current having a frequency twice that of the eddy currents, detection and localization of the defect are facilitated.

In the preferred method of the present invention there is induced a pattern of eddy currents of predetermined frequency and configuration in a substantially homogeneous portion of the object under test. Relative rotative movement is established between the eddy currents and a defect in the object under test to cause a change in the predetermined configuration of the pattern, and simultaneously therewith there is induced with the electromagnetic fields generated by the eddy currents a current or voltage having a frequency twice that of the eddy currents, whereby to ascertain the presence of a defect in the object.

While the method of the present invention may be carried into execution by many different types of apparatus that will readily suggest themselves to those skilled in the art in the light of the teachings herein, I prefer to employ a rotatable shaft to which there is secured an exploratory unit for rotation therewith. The exploratory unit is comprised of a bipolar magnet and at least one coil, the magnet being operable to induce a rotating pattern of eddy currents of predetermined configuration in a substantially homogeneous portion of the object under test and the said coil inductively positioned with respect to the electromagnetic fields generated by the eddy currents being responsive to any change in the predetermined configuration of the eddy current pattern occasioned by the presence of a defect. An instrument is electrically connected to the coil for indicating the presence of a defect.

The apparatus and method of the present invention can be used with magnetic or non-magnetic materials, better results, however, being obtained when the apparatus is used with non-magnetic test pieces. The defects that may be detected are any surface or sub-surface inhomogeneities in the metallic objects that will cause any change in the predetermined normal configuration of the induced eddy currents. As illustrative but not restrictive of such defects, inhomogeneities such as cracks, fissures, blowholes and inclusions may be noted.

In the light of the foregoing, it is among the several objects of my invention to provide an apparatus and method for detecting defects in metallic objects wherein effective penetration to and detection at considerable depths may be achieved; to provide an apparatus and method of the stated character wherein detection and localization of the defect are facilitated by inducing with the electromagnetic fields generated by the eddy currents a current or voltage having a frequency twice that of the eddy currents; and to provide an apparatus of the character above noted that is durable and economical in construction and positive in its detecting function.

Other objects and many of the attendant advantages of this invention will be readily appreciated as the same becomes better understood by reference to the following detailed description when considered in connection with the accompanying sheets of drawings wherein:

Fig. 1 is a view in partial sectional longitudinal elevation of one embodiment of the apparatus of the present invention wherein a mechanical rectifier is secured to the shaft for rotation therewith for rectifying a current of twice the frequency of the induced eddy currents;

Fig. 2 shows in broken outline the exploratory unit comprised of the bipolar magnet and a pair of series connected coils, the symmetrical pattern of eddy currents as induced by the magnet in a substantially homogeneous portion of the object under test, and a crack so positioned with reference to the exploratory unit in a phase of its rotation so as not to cause a change in the predetermined configuration of the symmetrical pattern;

Fig. 3 shows in broken outline the exploratory unit comprised of the bipolar magnet and a pair of series connected coils after having turned through 90° in a clockwise direction from its position in Fig. 2 and the changed configuration of the symmetrical pattern of eddy currents caused by interposing the crack in the path of rotation of the eddy current pattern;

Fig. 4 is a view in partial sectional longitudinal elevation of a still further embodiment of the apparatus of the present invention and differs from that of Fig. 1 in that an alternative type of mechanical rectifier is employed that is actuated by a generator driven by the rotatable shaft; and Fig. 5 is a fragmentary view taken on the line 5—5 of Fig. 4 showing in plan the generator driven by the rotatable shaft and the exploratory unit in broken outline.

Turning now to the drawings and more particularly to Figs. 1 and 4 thereof, there is shown depicted therein by way of example a housing 1 comprised of three sections identified by the reference characters 2, 3 and 4 respectively. The housing sections may be fabricated of any suitable material and are preferably but not necessarily removably associated to permit of ready disassembly for facilitating inspection or repair of the enclosed parts. The lower housing section 4 is shown for illustrative purposes as fabricated of a phenolic condensation product to reduce the weight of the apparatus and is of sufficient length to space the end of the exploratory unit 5 from the metallic plate 6 under examination.

The exploratory unit 5 is shown secured to a shaft 7 for rotation therewith. Suitable bearings 8 and 9 shown by way of illustration as of the ball bearing type are mounted in the apertured partition walls 10 and 11 of the upper and intermediate housing sections 2 and 3 and rotatably support the shaft 7. An annular member 12 rigidly affixed to the shaft 7 and in abutting engagement with the inner race of the ball bearing 8 takes the thrust of the shaft 7 and prevents any longitudinal movement thereof, thus maintaining the exploratory unit 5 at all times in properly spaced relation with reference to the plate 6 under investigation. Rotation may be imparted to the shaft 7 in any suitable manner, the mechanism for this purpose being shown in the drawings for illustrative purposes as comprised of a worm gear 13 rigidly secured to the shaft 7 and a worm 14 in meshing engagement therewith driven by the electric motor 15 supported from the intermediate housing section 3 in any convenient manner. The motor 15 is of the variable speed type and will maintain a substantially constant speed of rotation of its shaft at any speed to which it has been adjusted.

The exploratory unit 5 is shown by way of example as including a bipolar magnet 16 of the horseshoe type rigidly secured at its upper end in any suitable manner in the lower recessed portions of the crosspiece 17. The crosspiece 17 consists of two similar members 18 spaced at their juxtaposed ends and rigidly affixed at their outer ends to the cylindrical member 19 along a diameter thereof. Thus, the magnet 16 is supported in a manner such that its longitudinal axis substantially coincides with that of the shaft 7 and the cylindrical member 19. The magnet 16 is either a permanent magnet or of the electromagnetic type and is preferably highly magnetized so that relatively intense eddy currents may be induced in the plate 6.

A pair of series connected coils 20 and 21 is shown wound on a U-shaped core 22 fabricated of soft iron or other suitable ferromagnetic material. The coils 20 and 21 are so connected and wound that any electromotive forces induced therein will at all times be additive. The core 22 is embedded in any suitable manner at its upper end and in an insulating block 23 which in turn is supported in the upper recessed portions of the members 18 of the crosspiece. The cylindrical member 19 of the exploratory unit is welded or otherwise secured to the flange 24 of the shaft 7, the flange being interiorly recessed to accommodate the insulating block 23, all in the manner shown.

With the bipolar magnet 16 shown in the drawings, there is induced in a substantially homogeneous portion of the plate under test a rotating symmetrical pattern of eddy currents of the character depicted in Fig. 2. This pattern consists of two substantially similar lobes 25 symmetrically arranged with reference to a diameter of the cylindrical member 19 and the base of the magnet 16. As the magnet 16 is rotated over a substantially homogeneous portion of the plate, the symmetrical eddy current pattern having the configuration depicted in Fig. 2 is induced in the plate and this configuration, in the absence of a defect, is maintained in all rotative positions of the magnet. The multilobar eddy current pattern rotates and is locked with the magnet 16, the two lobes 25 each having a semicircular configuration and being induced in the plate with the base of the magnet as a diameter. The eddy currents induced in the plate 6 are alternating in character, their frequency being determined by the speed of rotation of the magnet 16 and shaft 7.

The pair of coils 20 and 21 need only be positioned with reference to the magnet 16 so that they are in inductive relation to the electromagnetic fields generated by the eddy currents. If the pair of coils is in a plane normal to that of the magnet as shown in Figs. 1, 2 and 4, there will be a maximum response or induced voltage in the coils attending the detection of a defect. While the transverse arrangement of the magnet and coils depicted in Figs. 1 and 4 is the preferred one, the invention is not to be understood as being restricted thereto since other transverse arrangements that are departures from a normal disposition may be employed so long as the requirements above noted are met. Also, a single coil with or without a ferromagnetic core may be employed if desired. Whether one or more coils are used, however, the voltage or current induced therein attending the detection of the defect will be alternating in character and have a frequency twice that of the eddy currents, for reasons to be pointed out more in detail hereinafter.

Thus, there is provided an exploratory unit 5 comprised of a bipolar magnet and at least one coil, the magnet being operable to induce a rotating pattern of eddy currents of predetermined configuration and distribution in a substantially homogeneous portion of the object under test and the coil inductively positioned with respect to the electromagnetic fields generated by the eddy currents being responsive only to a change in the predetermined configuration of the eddy current pattern occasioned by the presence of a defect.

Any current or voltage induced in the pair of coils 20 and 21 attending the detection of a defect in the plate 6 may be indicated on any convenient instrument 26 electrically connected therewith. This instrument may be either of the voltage or current type and is shunted by a variable resistor 27 for controlling its sensitivity. While it is not essential to a practicing of the invention, it is preferred to first amplify any current or voltage induced in the pair of coils 20 and 21 by means of the amplifier identified in general by the reference character 28 and then rectify the same by either the mechanical rectifier 29 (Fig. 1) or the mechanical rectifier 30 (Fig. 4) prior to energizing the electrical instrument 26. While mechanical rectifiers afford a convenient means of rectification any other type of prior art rectifier may be employed if desired. It is to be distinctly understood, however, that it is within the purview of the present invention to connect an instrument 26 that will indicate either an alternating voltage or current directly to the pair of coils 20 and 21 without the intervening amplifier and/or rectifier. If the rectifier employed is of the mechanical type it must be arranged to rectify a current of twice the frequency of the induced eddy currents, for reasons already noted.

For conducting any current or voltage induced in the pair of coils 20 and 21 to a point for conveniently energizing the amplifier 28, the shaft 7 may be fabricated as a tubular member and provided interiorly thereof with a pair of concentric conductors 31 and 32 electrically insulated from each other and from the shaft as clearly shown in the drawings. The conductor 31 is a solid conductor and substantially coincides with the longitudinal axis of the shaft 7 while the remaining conductor 32 is hollow and concentric with the first conductor 31. The free ends of the coils 20 and 21 are connected by the conductors 33 and 34 provided with terminals respectively with the inner and outer concentric conductors 31 and 32 of the shaft 7.

While any convenient means may be employed for electrically connecting the input side of the amplifier 28 with the free ends of the concentric conductors 31 and 32, it is preferred to employ a novel arrangement devised by me because it provides a low and substantially invariable contact resistance. This is highly desirable since the voltages induced in the pair of coils 20 and 21 attending the detection of the defect are in general quite small.

As indicated in the drawings an electrically conductive driving pulley 35 is secured to the outer conductor 32 of the concentric pair in an electrically conductive manner and is electrically insulated from the shaft 7. A second electrically conductive driven pulley 36 is rotatably mounted in a bearing 37 of an insulating block 38 which is securely fixed on a platform 39 supported by the spacing elements 40 from the partition wall 10. An electrically conductive belt 41, which is shown by way of illustration as an endless coiled resilient metallic member, engages the driving and driven pulleys 35 and 36. Brushes 42 and 43 supported from the insulating extension 44 secured to the upper housing section 2 contact the driven pulley 36 and the inner conductor 31 of the concentric pair substantially axially thereof.

The axially mounted brushes 42 and 43 provide a low and substantially invariable contact resistance. These desirable features are brought about by the relatively low velocity obtaining at the axis of the shaft conductor 31 and at the axis of the driven pulley 36. Thus, it is clear that the foregoing arrangement provides an extremely convenient and effective means for electrically connecting the input side of the amplifier 28 with the free ends of the concentric conductor pair 31 and 32.

The amplifier 28 may be of any type known to the prior art and may include any desired number of stages of amplification. It is shown in the drawings for illustrative purposes as including a single triode having the conventional cathode 45, grid 46 and anode 47. The cathode 45 is energized by any suitable source of electromotive force 48 to render the same electron emissive; and the grid 46 is biased by the source of electromotive force 49 so that the amplifier operates class A. The grid circuit is completed by the conductors 50 and 51 connected to the brushes 42 and 43 respectively. Thus it is clear that any voltage induced in the pair of coils 20 and 21 of the exploratory unit provides the excitation for the amplifier 28. The plate circuit includes the primary winding 52 of the transformer 53 and the source of plate voltage 54 shunted by the bypass condenser 55.

Referring more particularly to Fig. 1 of the drawings it will be observed that the secondary 56 of the transformer is connected by the conductors 57 and 58 to the spring biased brushes 59 and 60 respectively of the mechanical rectifier 29. As previously noted the mechanical rectifier 29 is arranged to rectify a current or voltage of twice the frequency of the induced eddy currents. The remaining two brushes 61 and 62 supply the rectified output through the conductors 63 and 64 to the instrument 26 for indicating the presence of a defect. The brushes 59, 60 and 61 for illustrative purposes are all shown spring biased and are conveniently supported in the insulating housing 65 as clearly indicated in the drawings.

Mechanical rectifier 29 is insulatingly mounted on the shaft 7 by the sleeve 66 for rotation therewith and includes two mutually insulated commutator members, the ring portions 67 and 68 of which are in continuous engagement with the brushes 59 and 60 respectively. The commutator members are each provided with a pair of projecting portions 69 and 70 respectively that successively and alternately contact the brushes 61 and 62. The brushes 61 and 62 are adjustable as a unit with reference to the projecting portions 69 and 70 of the commutator members to compensate for any change in phase of the current or voltage induced in the coils 20 and 21 of the exploratory unit 5. The mechanical rectifier of Fig. 1 in its details of construction and operation is identical with that described in United States Patent 2,162,710 granted to me June 20, 1939, except that each commutator member is provided with two projections to enable the rectification of a current of twice the frequency of the induced eddy currents instead of one projection as in the patented structure.

The embodiment depicted in Fig. 4 is identical in operation with that of Fig. 1 and differs only in construction from the latter to the extent that a different type of mechanical rectifier is employed. In this embodiment the mechanical rectifier 30 is of the well known vibrating armature type in which the solenoid 71 for actuating the armature 72 of the rectifier is energized by the generator 73 driven by the shaft 7. Since the rectifier 30 must rectify a current of twice the frequency of the induced eddy currents the generator 73 must provide a source of alternating voltage of a frequency twice that of the eddy currents. This is conveniently achieved by employing in the generator 73 a permanent four-pole magnet 74 secured to the shaft 7 for rotation therewith and rotatable adjacent the stationarily mounted coils 75 as clearly indicated in Fig. 5 of the drawings. The coils 75 are serially arranged and are connected to the solenoid 71 for energizing the same. Either the magnet 74 or the coils 75 may be adjustably mounted with reference to each other in order to establish synchronism between the rectifier 30 and the current or voltage to be rectified and thus provide means for compensating for any change in phase of the current or voltage induced in the coils 20 and 21.

As indicated in the drawings the vibrating armature 72 of the rectifier 30 is provided with two movable contacts 76 and 77 for intermittent cooperation and engagement with their respective stationary contacts 78 and 79. The stationary contacts 78 and 79 are connected to the free ends of the secondary 56 of the transformer. A condenser 80 is connected to the vibrating armature 72 and to the midtap of the transformer secondary 56 for energizing the electrical instrument 26 through the conductors 81. If the vibrating armature 72 has been properly synchronized with reference to the current to be rectified, the engagement of the contacts 77 and 79 will be of a duration to rectify one-half cycle of any alternating current induced in the transformer secondary 56 while the remaining half cycle of the current will charge the condenser 80 through the engagement of the contacts 76 and 78. Thus by alternate engagement of the pairs of contacts any alternating current induced in the transformer secondary 56 will be rectified to thus provide the condenser 80 with a charge of fixed polarity.

Both embodiments of the invention depicted in Figs. 1 and 4 of the drawings are identical in operation as employed for the detection of a defect. Thus, as previously noted herein if the magnet 16 is rotated over a substantially homogeneous portion of the plate 6 under test there will be induced in the plate a rotating multilobar eddy current pattern, as indicated in Fig. 2, this configuration being maintained in all rotative positions of the magnet in the absence of a defect. Since, in the preferred embodiments, the magnet 16 is highly magnetized and is rotated at a relatively low substantially constant speed, low-frequency high-intensity eddy currents are induced in the plate to enable effective penetration to and detection at considerable depths.

It is important to note that the multilobar eddy current pattern rotates and is locked with the magnet 16, and two lobes 25 each having a semicircular configuration and being induced in the plate with the base of the magnet 16 as a diameter. Since neither the intensity nor the configuration of the multilobar eddy current pattern delineated in Fig. 2 changes when induced in a homogeneous portion of the object under test and the pair of coils 20 and 21 rotates with the magnet 16, it follows that the flux generated by the eddy currents and linking with these coils does not change when rotating the exploratory unit 5 over a homogeneous portion of the object under test. Hence, when no inhomogeneity underlies the exploratory unit 5 no voltage is induced in the coils 20 and 21 because the flux linking therewith does not change. Consequently the instrument 26 suffers no deflection.

The situation, however, is otherwise if inhomogeneities are present in the plate 6. If a defect such as a crack 82 (Figs. 2 and 3) is interposed in the path of rotation of the symmetrical eddy current pattern, the inability of the eddy currents to traverse the crack results in a progressive change of the predetermined configuration of the symmetrical pattern depicted in Fig. 2. The accompanying progressive change in the distribution of the flux generated by the eddy currents and the progressive change in linkages thereof with the coils 20 and 21 of the exploratory unit 5 causes the induction in the coils 20 and 21 of an alternating voltage having a frequency twice that of the eddy currents.

The foregoing is clearly illustrated in Figs. 2 and 3 of the drawings wherein the crack 82 is shown for illustrative purposes as lying substantially along a diameter of the exploratory unit 5; and in Fig. 3 of which the exploratory unit is disclosed in a phase of its rotation after having turned through 90° in a clockwise direction from its position in Fig. 2. In Fig. 3 the symmetrical eddy current pattern has now changed its configuration to one wherein four lobes 83 are present by virtue of the inability of the currents to traverse the crack interposed in their paths.

The progressive change in the configuration of the eddy current pattern from that delineated in Fig. 2 to that depicted in Fig. 3 causes the induction in the coils of one-half cycle of the alternating voltage. Since for each one-quarter revolution of the exploratory unit 5, one-half cycle of the voltage is induced in the coils 20 and 21, it follows that any voltage induced in these coils will have a frequency twice that of the induced eddy currents for the reason that in one revolution of the exploratory unit the alternating eddy currents go through one cycle only. Any current or voltage so induced will be rectified to cause energization of the instrument 26. Thus, any deflection of the instrument pointer will indicate the presence of a defect.

If the meter 26 gives any response it is known that the exploratory unit 5 is over the defect; and when the response of the meter is a maximum it is known for a certainty that the defect lies substantially along a diameter of the exploratory unit 5 as indicated in Figs. 2 and 3. In the latter case the eddy currents in their rotation are symmetrically arranged relative to the defect. Thus, detection and localization of the defect are facilitated.

If it is desired to determine the approximate depth of a subsurface defect in an object under test the following procedure is adopted. The mechanical rectifiers in both embodiments of the invention are first adjusted for proper phase relationship with the current or voltage induced in the coils 20 and 21 when the exploratory unit is over a surface defect. As the eddy currents penetrate the material of the object under test, it is known that their phase, among other things, changes with attendant change in phase of the electromagnetic fields which they generate. Therefore, when a subsurface defect is encountered in the course of exploration while the indicator 26 will indicate the presence of this defect, the indication will be somewhat diminished from that obtaining in the case of a surface defect. The reason for this lies in the fact that the phase of the current or voltage induced in the coils 20 and 21 has changed so that the mechanical rectifiers in both embodiments are no longer adjusted to a proper phase relationship with reference to the current to be rectified. If now, with the exploratory unit in juxtaposed relation to the subsurface defect, the pair of brushes 61 and 62 of the embodiment in Fig. 1 or the permanent magnet 74 of the generator in Fig. 4 is shifted so as to restore the maximum indicator deflection obtaining for a surface defect, the amount of brush shift or shift of the permanent magnet to accomplish this will be proportional to the depth of the subsurface defect. The proportionality factor must of course be empirically determined by suitable calibration.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

I claim:

1. A method of detecting defects in electrically conductive objects which comprises the steps of inducing a rotating pattern of eddy currents of predetermined distribution in a substantially homogeneous portion of the object under test, causing departures from the aforesaid distribution by interposing a defect in the path of rotation of the eddy current pattern, and noting the character of the electromagnetic fields generated by the eddy currents in their departures, whereby to ascertain the presence of a defect in said object.

2. A method of detecting defects in electrically conductive objects which comprises the steps of inducing a rotating symmetrical pattern of eddy currents of predetermined configuration in a substantially homogeneous portion of the object under test, progressively changing the predetermined configuration of the symmetrical pattern of eddy currents by interposing a defect in the path of rotation of the eddy current pattern, and noting the character of the electromagnetic fields generated by the eddy currents during the progressive change in the configuration of the symmetrical pattern, whereby to ascertain the presence of a defect in said object.

3. A method of detecting defects in electrically conductive objects which comprises the steps of inducing alternating eddy currents of a predetermined frequency in an object under test, establishing relative rotative movement between said eddy currents and a defect in the object under test, and simultaneously therewith inducing with the electromagnetic fields generated by the eddy currents an alternating voltage having a frequency twice that of the eddy currents, whereby to ascertain the presence of a defect in said object.

4. A method of detecting defects in electrically conductive objects which comprises the steps of inducing a pattern of eddy currents of predetermined frequency and configuration in a substantially homogeneous portion of the object under test, establishing relative rotative movement between said eddy currents and a defect in the object under test to cause a change in the predetermined configuration of the pattern, and simultaneously therewith inducing with the electromagnetic fields generated by the eddy currents a voltage having a frequency twice that of the eddy currents, whereby to ascertain the presence of a defect in said object.

5. A method of detecting defects in electrically conductive objects which comprises the steps of inducing a rotating pattern of eddy currents of predetermined distribution in a substantially homogeneous portion of the object under test, causing departures from the aforesaid distribution by interposing a defect in the path of rotation of the eddy current pattern with said eddy currents symmetrically arranged relative to the defect, and noting the character of the electromagnetic fields generated by the eddy currents in their departures, whereby to ascertain the presence of a defect in said object.

6. A method of detecting defects in electrically conductive objects which comprises the steps of inducing alternating eddy currents of predetermined frequency and distribution in a substantially homogeneous portion of the object under test, causing departures from the aforesaid distribution by establishing relative rotative movement between said eddy currents and a defect in the object under test, and simultaneously therewith inducing with the electromagnetic fields generated by the eddy currents an alternating voltage having a frequency twice that of the eddy currents, whereby to ascertain the presence of a defect in said object.

7. A method of detecting defects in electrically conductive objects which comprises the steps of inducing a symmetrical pattern of eddy currents of a predetermined configuration and relatively low frequency in a substantially homogeneous portion of the object under test, establishing relative rotative movement between said symmetrical eddy current pattern and a defect in the object under test to cause a change in the predetermined configuration thereof, and simultaneously therewith inducing with the electromagnetic fields generated by the eddy currents a voltage having a frequency twice that of the eddy currents, whereby to ascertain the presence of a defect in said object.

8. A method of detecting defects in electrically conductive objects which comprises the steps of inducing a rotating pattern of eddy currents of predetermined configuration in a substantially homogeneous portion of the object under test, progressively changing the predetermined configuration of the pattern in the presence of a defect, and noting the character of the electromagnetic fields generated by the eddy currents during the progressive change in the pattern configuration, whereby to ascertain the presence of a defect in said object.

9. An apparatus for detecting defects in electrically conductive objects comprising in combination means for inducing a rotating pattern of eddy currents of predetermined configuration in a substantially homogeneous portion of the object under test, and means responsive to the electromagnetic fields generated by said eddy currents for determining any departure of the eddy current pattern from the predetermined configuration, whereby to indicate the presence of a defect in said object.

10. An apparatus for detecting defects in electrically conductive objects comprising in combination rotatable means for inducing a rotating pattern of eddy currents of predetermined configuration in a substantially homogeneous portion of the object under test and means rotatable with said first mentioned means and responsive to the electromagnetic fields generated by said eddy currents for determining any departure of the eddy current pattern from the predetermined configuration, whereby to indicate the presence of a defect in said object.

11. An apparatus for detecting defects in electrically conductive objects comprising in combination a housing, a shaft rotatably supported by said housing, a bi-polar magnet and a pair of series connected coils secured to the shaft at one end thereof for rotation therewith, the said magnet being operable to induce a rotating pattern of eddy currents of predetermined configuration in a substantially homogeneous portion of the object under test and the said pair of coils inductively positioned with respect to the electromagnetic fields generated by the eddy currents being responsive to any change in the predetermined configuration of the eddy current pattern occasioned by the presence of a defect, a pair of electrically insulated concentric conductors arranged for rotation with said shaft and electrically connected with the pair of coils, a mechanical rectifier secured to the shaft for rotation therewith for rectifying a current of twice the frequency of the induced eddy currents, an electrical instrument for indicating the presence of a defect connected to the output side of the rectifier, and means for connecting the input side of said rectifier to the free ends of said concentric conductor pair, the said means including an electrically conductive driving pulley secured ot the outer conductor of the concentric pair, a second electrically conductive driven pulley, an electrically conductive belt engaging said driving and driven pulleys and a pair of brushes, the said brushes contacting the driven pulley and the inner conductor of said concentric conductor pair substantially axially thereof.

12. An apparatus for detecting defects in electrically conductive objects comprising in combination a housing, a shaft rotatably supported by said housing, a bipolar magnet and a pair of series connected coils secured to the shaft at one end thereof for rotation therewith, the said magnet being operable to induce a rotating pattern of eddy currents of predetermined configuration in a substantially homogeneous portion of the object under test and the said pair of coils inductively positioned with respect to the electromagnetic fields generated by the eddy currents being responsive to any change in the predetermined configuration of the eddy current pattern occasioned by the presence of a defect, a pair of electrically insulated concentric conductors arranged for rotation with said shaft and electrically connected with the pair of coils, a mechanical rectifier for rectifying a current of twice the frequency of the induced eddy currents, a generator driven by said shaft for actuating the rectifier in synchronism with the current to be rectified, an electrical instrument for indicating the presence of a defect connected to the output side of the rectifier, and means for connecting the input side of said rectifier to the free ends of said concentric conductor pair, the said means including an electrically conductive driving pulley secured to the outer conductor of the concentric pair, a second electrically conductive driven pulley, an electrically conductive belt engaging said driving and driven pulleys and a pair of brushes, the said brushes contacting the driven pulley and the inner conductor of said concentric conductor pair substantially axially thereof.

13. An apparatus for detecting defects in electrically conductive objects comprising in combination a housing, a shaft rotatably supported by said housing, a bipolar magnet and a pair of series connected coils secured to the shaft at one end thereof for rotation therewith, the said magnet being operable to induce a rotating pattern of eddy currents of predetermined configuration in a substantially homogeneous portion of the object under test and the said pair of coils inductively positioned with respect to the electromagnetic fields generated by the eddy currents being responsive to any change in the predetermined configuration of the eddy current pattern occasioned by the presence of a defect, a pair of electrically insulated concentric conductors arranged for rotation with said shaft and electrically connected with the pair of coils, an electrical instrument for indicating the presence of a defect and means for connecting the said instrument to the free ends of said concentric conductor pair, the said means including an electrically conductive driving pulley secured to the outer conductor of the concentric pair, a second electrically conductive driven pulley, an electrically conductive belt engaging said driving and driven pulleys and a pair of brushes, the said brushes contacting the driven pulley and the inner conductor of said concentric conductor pair substantially axially thereof.

14. An apparatus for detecting defects in electrically conductive objects comprising in combination a housing, a shaft rotatably supported by said housing, a bipolar magnet and a pair of series connected coils secured to the shaft at one end thereof for rotation therewith, the said magnet being operable to induce a rotating pattern of eddy currents of predetermined configuration in a substantially homogeneous portion of the object under test and the said pair of coils inductively positioned with respect to the electromagnetic fields generated by the eddy currents being responsive to any change in the predetermined configuration of the eddy current pattern occasioned by the presence of a defect, a mechanical rectifier for rectifying a current of twice the frequency of the induced eddy currents, an electrical instrument for indicating the presence of a defect connected to the output side of said rectifier, and means for connecting the input side of said rectifier to the pair of coils.

15. An apparatus for detecting defects in electrically conductive objects comprising in combination a rotatable shaft, a bipolar magnet and a pair of series connected coils secured to the shaft for rotation therewith, the said magnet being operable to induce a rotating pattern of eddy currents of predetermined configuration in a substantially homogeneous portion of the object under test and the said pair of coils inductively positioned with respect to the electromagnetic fields generated by the eddy currents being responsive to any change in the predetermined configuration of the eddy current pattern occasioned by the presence of a defect, a rectifier for rectifying any current induced in the pair of coils, an electrical instrument for indicating the presence of a defect connected to the output side of said rectifier and means for connecting the input side of said rectifier to the pair of coils.

16. An apparatus for detecting defects in electrically conductive objects comprising in combination a rotatable shaft, a bipolar magnet and a coil secured to the shaft for rotation therewith, the said magnet being operable to induce a rotating pattern of eddy currents of predetermined configuration in a substantially homogeneous portion of the object under test and the said coil inductively positioned with respect to the electromagnetic fields generated by the eddy currents being responsive to any change in the predetermined configuration of the eddy current pattern occasioned by the presence of a defect, and an instrument electrically connected to the coil for indicating the presence of a defect.

17. An apparatus for detecting defects in electrically conductive objects comprising in combination a rotatable shaft, means secured to said shaft for inducing a rotating pattern of eddy currents of predetermined configuration in a substantially homogeneous portion of the object under test, inductive means also secured to said shaft and responsive to any change in the predetermined configuration of the eddy current pattern occasioned by the presence of a defect, and means electrically connected to said second mentioned means for indicating the presence of a defect.

18. An apparatus for detecting defects in electrically conductive objects comprising in combination a rotatable shaft, a bipolar magnet and a coil secured to the shaft for rotation therewith, the said magnet being operable to induce a rotating pattern of eddy currents of predetermined configuration in a substantially homogeneous portion of the object under test and the said coil inductively positioned with respect to the electromagnetic fields generated by the eddy currents being responsive to any change in the predetermined configuration of the eddy current pattern occasioned by the presence of a defect, a pair of electrically insulated concentric conductors arranged for rotation with said shaft and electrically connected to the coil, an electrical instrument for indicating the presence of a defect, and means for connecting the said instrument to the free ends of said concentric conductors.

19. An apparatus for detecting defects in electrically conductive objects comprising in combination a rotatable shaft, a bipolar magnet and a coil secured to the shaft for rotation therewith, the said magnet being operable to induce a rotating pattern of eddy currents of predetermined configuration in a substantially homogeneous portion of the object under test and the said coil inductively positioned with respect to the electromagnetic fields generated by the eddy currents being responsive to any change in the predetermined configuration of the eddy current pattern occasioned by the presence of a defect, a pair of electrically insulated concentric conductors arranged for rotation with said shaft and electrically connected to the coil, an electrical instrument for indicating the presence of a defect, and means for connecting the said instrument to the free ends of said concentric conductors, the said means including an electrically conductive driving pulley secured to the outer conductor of the concentric pair, a second electrically conductive driven pulley, an electrically conductive belt engaging said driving and driven pulleys and a pair of brushes, the said brushes contacting the driven pulley and the inner conductor of said concentric conductor pair substantially axially thereof.

20. An apparatus for detecting defects in electrically conductive objects comprising in combination a rotatable shaft, a bipolar magnet and a pair of series connected coils secured to the shaft for rotation therewith, and an instrument electrically connected to said coils for indicating the presence of a defect, the said magnet and pair of coils being transversely disposed.

ROSS GUNN.